United States Patent [19]

Mardikian

[11] Patent Number: 5,138,851
[45] Date of Patent: Aug. 18, 1992

[54] ACTIVE SEAT COOLING SYSTEM

[75] Inventor: Albert Mardikian, Corona Del Mar, Calif.

[73] Assignee: Golden Empire Trading Co., Inc., Corona Del Mar, Calif.

[21] Appl. No.: 631,667

[22] Filed: Dec. 14, 1990

[51] Int. Cl.[5] .............................................. F25D 17/02
[52] U.S. Cl. ....................................... 62/244; 62/261; 62/434
[58] Field of Search .................. 62/244, 261, 434, 435

[56] References Cited

U.S. PATENT DOCUMENTS

| | | | |
|---|---|---|---|
| 1,811,829 | 6/1931 | Folberth et al. | 237/12.3 R |
| 2,722,266 | 11/1955 | Kersten | 62/261 X |
| 2,726,658 | 12/1955 | Chessey | 62/261 X |
| 2,782,834 | 2/1957 | Vigo | 62/261 X |
| 2,912,832 | 11/1959 | Clark | 62/261 X |
| 3,097,505 | 7/1963 | Smith | 62/261 |
| 4,719,764 | 1/1988 | Cook | 62/261 |

*Primary Examiner*—William E. Tapolcai
*Attorney, Agent, or Firm*—Klein & Szekeres

[57] ABSTRACT

A cooling system for cooling units of furniture adapted for supporting the human body, and for car seats, steering wheels and arm rests, includes two main components. A closed loop air conditioning subsystem has a first motor which drives a compressor in which a refrigerant fluid is compressed. The compressed fluid is passed into a condenser where the compressed fluid is cooled by dissipating its heat into the environment, and from where the compressed fluid is released through an expansion valve into an evaporator. The evaporator becomes cool due to expansion of the refrigerant fluid into a gas and consequent absorption of heat from the evaporator's body and immediate environment. The refrigerant gas is returned from the evaporator into the compressor. The second main component of the invention is a subsystem where a working fluid is in heat exchange relationship with the evaporator of the first system whereby the working fluid is cooled in the evaporator and is thereafter sent by a pump or fan, driven by a suitable motor, into cooling members, such as cooling coils incorporated within the seat or other item of furniture (or related item) which is cooled directly.

19 Claims, 5 Drawing Sheets

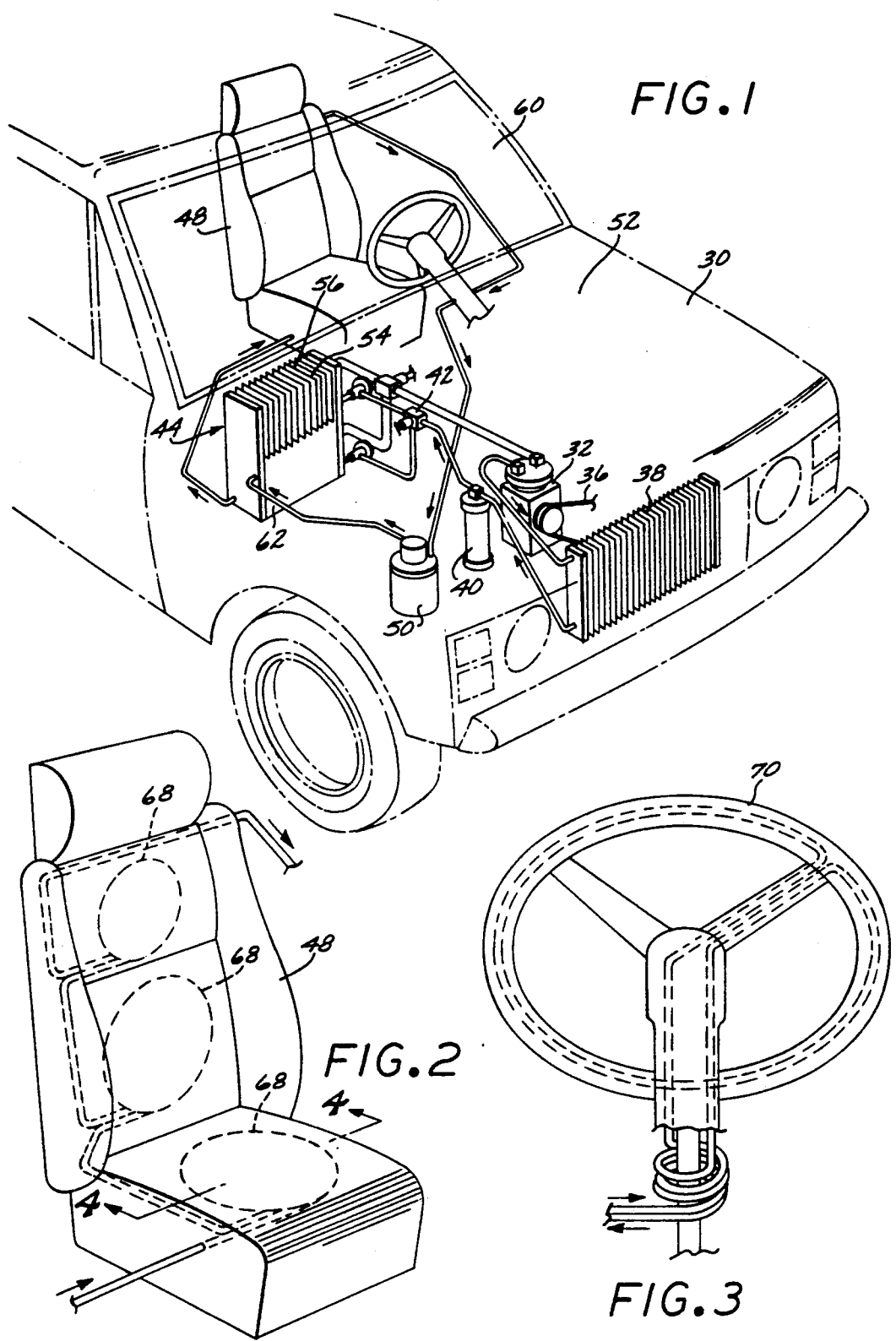

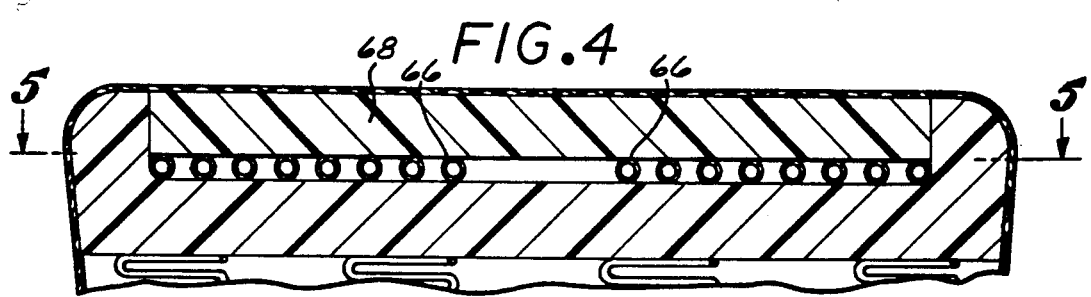
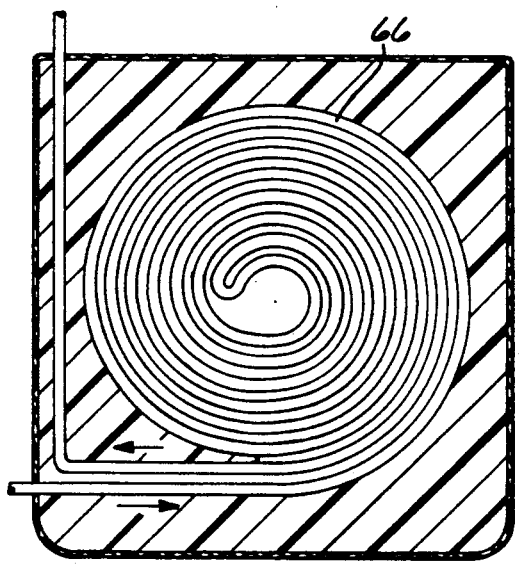 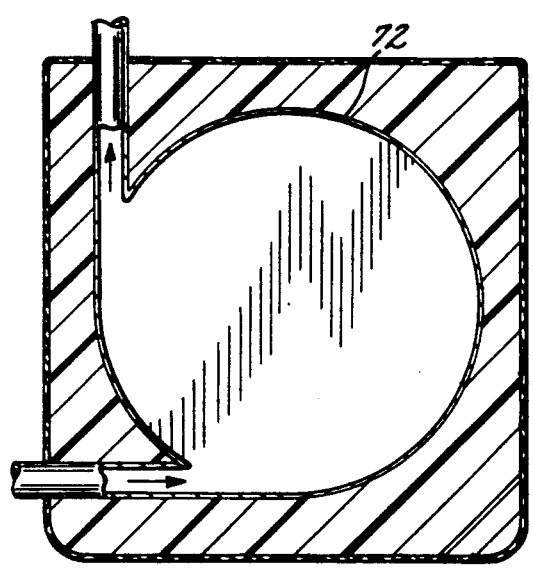
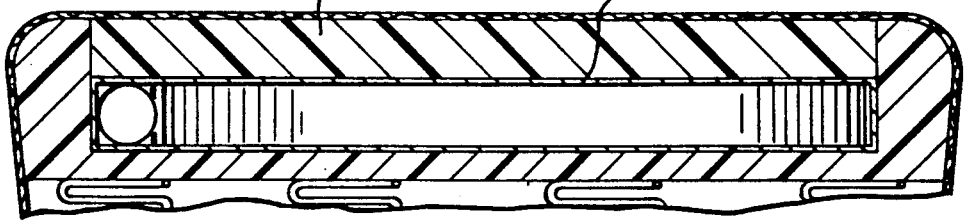
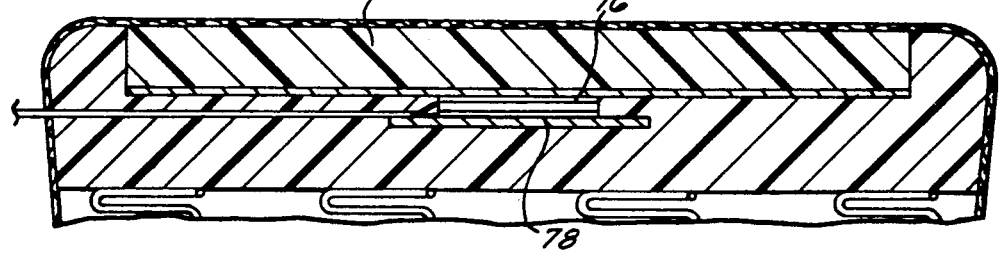

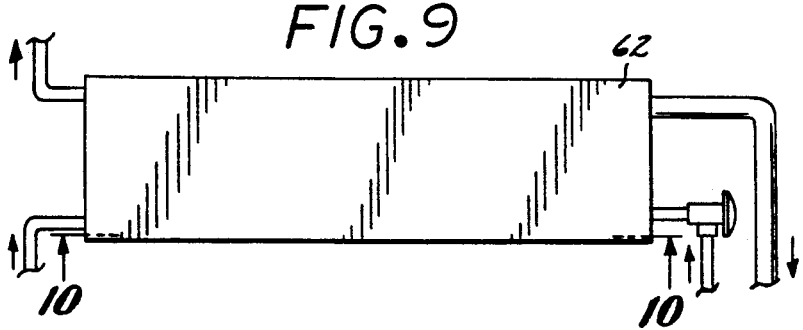
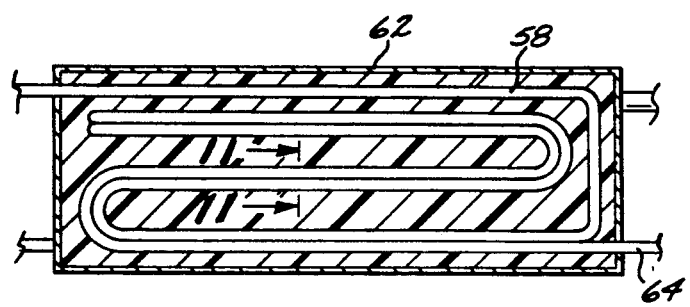
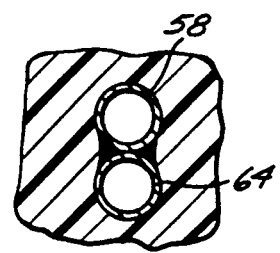
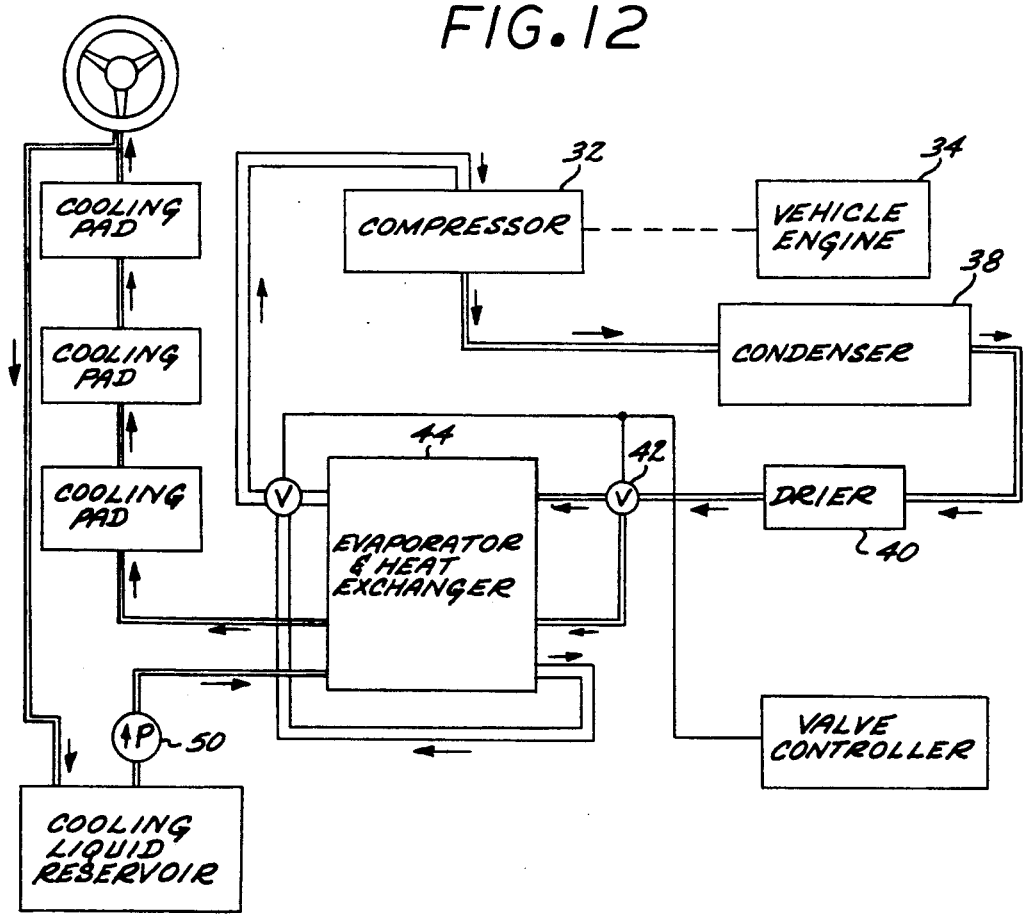

ACTIVE SEAT COOLING SYSTEM

BACKGROUND OF THE INVENTION

1. Field of the Invention

The present invention is directed to a system for cooling furniture units of the type adapted for supporting the human body. More particularly, the present invention is directed to a system which operates in conjunction with a conventional or substantially conventional air conditioning system, to cool seats and like furniture units, particularly seats of motor vehicles.

2. Brief Description of the Prior Art

Air conditioning systems, including air conditioners for automobiles, are well known in the prior art. A feature of conventional air conditioners, and particularly of automobile air conditioners, is that they force ambient air through an evaporator which is chilled in the inside, and thereafter exude the chilled air from a vent or the like. Some individuals, however, would prefer not to have chilled air directed at them and therefore prefer an alternative way of cooling their environment. In addition, for understandable reasons, conventional automotive air conditioners provide virtually no cooling effect in convertible automobiles when the convertible top is down. Still further, occupants of certain types of luxury cars, and especially of race cars, would often prefer direct cooling of the seats, of the steering wheel and arm rests, instead of, or in addition to conventional air conditioning which utilizes chilled air blown out of air conditioning vents. Direct cooling of furniture units of the type which supports the human body, such as seats, sofas and the like, would also be preferred by certain individuals instead of, or in addition to traditional "forced air" air conditioning systems. As far as the present inventor is aware, the above-summarized needs have not been met in the prior art.

SUMMARY OF THE INVENTION

It is an object of the present invention to provide a cooling system which is adapted for directly cooling furniture units and like items, such as seats, sofas and particularly seats of automobiles.

It is another object of the present invention to provide a cooling system which meets the foregoing objective and can be used in conjunction with conventional automotive air conditioning systems.

The foregoing and other objects and advantages are attained by a cooling system which includes two main components. A first main component is a closed loop air conditioning subsystem having a first motor which drives a compressor in which a refrigerant fluid (such as freon) is compressed. The compressed fluid is passed into a condenser where it is cooled by dissipating its heat into the environment, and from where the compressed liquid is released through an expansion valve into an evaporator. The evaporator becomes cold due to evaporation of the refrigerant liquid into a gas, which requires absorption of heat from the evaporator's body and immediate environment. The refrigerant gas returns from the evaporator into the compressor. (In conventional air conditioners air is forced across plates or fins (or like heat exchange devices) in the evaporator, and the chilled air is directed into the interior of an automobile or building structure to provide air conditioning therein.)

The second main component of the invention is a subsystem where a working fluid is in heat exchange relationship with the evaporator of the first system, whereby the working fluid is cooled in the evaporator and is thereafter sent by a pump or fan, driven by a suitable motor, into cooling members, such as cooling coils incorporated within a seat, arm rest or other item of furniture (or related item) which is cooled directly. The working fluid may be air which is forced across the evaporator and is thereafter directed through conduits into a cavity formed in a cooling member and located within the interior of the seat. From the cavity the air is allowed to exit into the environment. Preferably, in accordance with the present invention the working fluid is a liquid which is circulated in a closed loop system by the pump, from the evaporator to the cooling coils located within the seats or like units of furniture.

The features of the present invention can be best understood together with further objects and advantages, by reference to the following description, taken in connection with the accompanying drawings, wherein like numerals indicate like parts.

BRIEF DESCRIPTION OF THE DRAWINGS

FIG. 1 is a schematic perspective view of an automobile incorporating the first preferred embodiment of the present invention.

FIG. 2 is a schematic perspective view of an automobile seat which is cooled in accordance with the present invention;

FIG. 3 is a schematic perspective view of an automobile steering wheel which is cooled in accordance with the present invention.

FIG. 4 is a schematic cross-sectional view of the automobile seat shown on FIG. 2, the cross-section being taken on lines 4,4 of FIG. 2;

FIG. 5 is another schematic cross-sectional view of the automobile seat shown on FIG. 2, the cross-section being taken on lines 5,5 of FIG. 4;

FIG. 6 is a schematic cross-sectional view of an automobile seat cooled in accordance with a second preferred embodiment of the present invention, the cross-section being analogous to the one shown on FIG. 5;

FIG. 7 is another schematic cross-sectional view of an automobile seat cooled in accordance with a second preferred embodiment of the present invention, the cross-section being analogous to the one shown on FIG. 4;

FIG. 8 is a schematic cross-sectional view of an automobile seat cooled in accordance with a third preferred embodiment of the present invention;

FIG. 9 is a schematic plan view of the evaporator heat exchanger used in accordance with the first preferred embodiment of the present invention;

FIG. 10 is a schematic cross-sectional view of the evaporator heat exchanger, taken on lines 10,10 of FIG. 9;

FIG. 11 is a schematic cross-sectional view showing the heat exchange coils or conduits in the evaporator heat exchanger of FIGS. 9 and 10;

FIG. 12 is a block-diagrammatic representation of the first preferred embodiment of the invention, utilized in motor vehicles;

DESCRIPTION OF THE PREFERRED EMBODIMENTS

Figure 13:
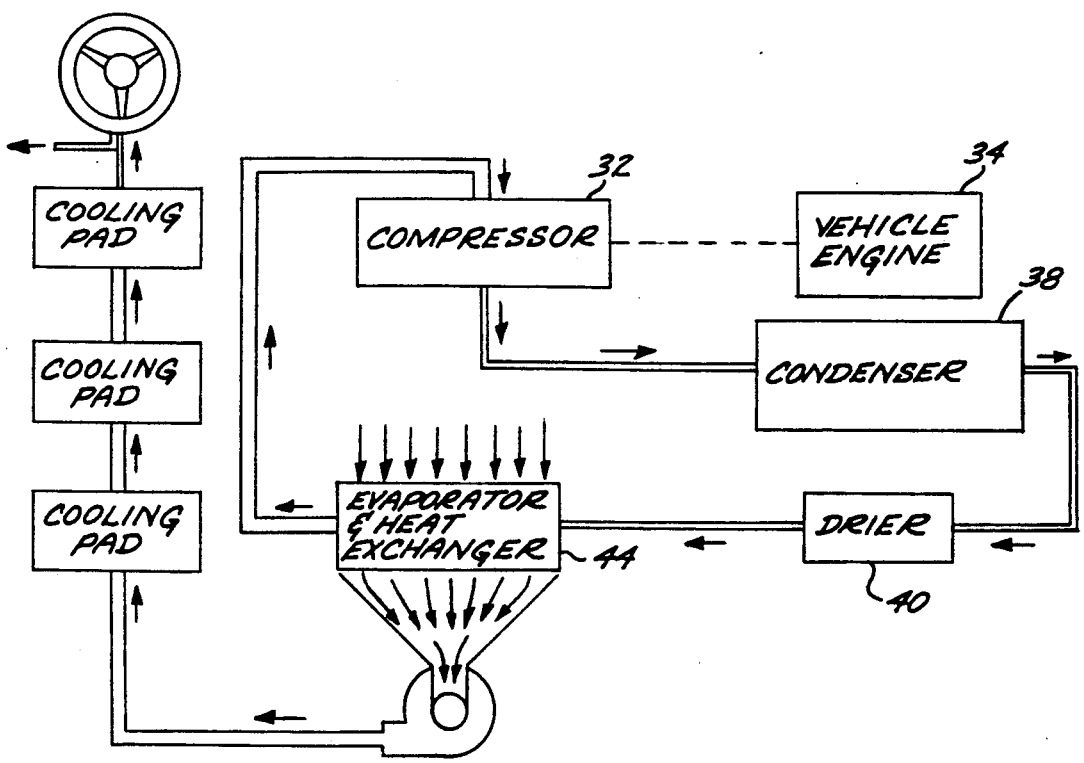
FIG. 13 is a block-diagrammatic representation of the second preferred embodiment of the invention.

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Referring now to the drawing figures, and particularly to the FIGS. 1-5 and 9-12, a first preferred embodiment of the cooling system of the present invention is disclosed. It should be noted at the outset that the cooling system of the present invention is designed for directly cooling one or more seats and other parts (such as the steering wheel and arm rest) of motor vehicles, as well as for directly cooling items of furniture, particularly furniture of the type which is utilized for supporting the human body (such as seats, chairs, recliners and sofas). The invention can also be used to cool garments, particularly suits worn by race car drivers. The invention is, however, primarily described in connection with the first preferred embodiment which is particularly adapted for cooling one or more seats and the steering wheel of a motor vehicle, such as a luxury or race car. The present description with emphasis of utilizing the invention in an automotive environment, should, however not be construed as a limitation. Returning back to the description of the first preferred embodiment, when used in an automotive environment, the present invention, utilizes the conventional (or substantially conventional) air conditioning system of the motor vehicle or automobile 30 as a part or subsystem of the entire inventive apparatus.

As is known in the art, the air conditioning system of an automobile 30 includes a compressor 32 which is usually driven by the engine of the automobile 30 through a drive belt 36. The compressor 32 compresses a refrigerant fluid (usually FREON ™ gas) which gets hot as a result of the compression. The compressed refrigerant is then passed into a condenser 38 (resembling a radiator) where the heat of compression of the refrigerant is dissipated into the environment. In the condenser the refrigerant liquifies. The liquefied refrigerant is then passed through a drier 40 which usually filters the refrigerant, removes moisture and acts as a liquid reservoir. From the drier 40 the refrigerant passes through an expansion valve 42 into an evaporator 44. A severe pressure drop occurs across the expansion valve 42. Consequently as the refrigerant enters the evaporator 44 it vaporizes, absorbing heat in the process. The evaporator 44 is cooled in the process. In a conventional air conditioner, air is passed with a fan (not shown) through the evaporator 44 which acts as a heat exchanger and extracts heat from the air, thereby chilling the same. Chilled air, which emerges from the evaporator 44 is then introduced into the passenger compartment of the automobile 30 to provide air conditioning therein. The cold gaseous refrigerant is returned from the evaporator 44 into the compressor 32, thereby closing the "loop" of the refrigerant's cyclic pass through the system.

In accordance with the present invention, the conventional air conditioning system of the automobile 30 is utilized (as modified in the manner described below) to refrigerate a working fluid which is passed, separately from the cycling of the refrigerant of the air conditioning system, through the evaporator 44 and into cooling members (preferably cooling coils) disposed within one or more seats 48 of the automobile 30. To this end, a pump 50 is mounted within the engine compartment 52 of the automobile 30. The pump 50 is powered by a motor (not shown) which may be electrically driven by the automobile's electrical system, or which may be driven mechanically through appropriate gears (not shown) or belts (not shown) from the automobile's drive shaft (not shown). In the herein described first preferred embodiment, the pump 50 is a commercially available fuel pump of approximately 55 Watts power capacity. On the schematic drawings of FIGS. 1 and 12 the pump 50 is shown together with the motor which drives it, and together with a reservoir for the working fluid. Whenever, as in the first preferred embodiment, the present invention has a closed loop cycling system for the working fluid, it is preferred to utilize a liquid as the working fluid. Preferably, the working fluid comprises a lower alcohol (such as ethyl alcohol) and a commercially available automotive anti-freeze liquid which itself contains ethylene glycol. A preferred embodiment of the working fluid used in the first preferred embodiment is a substantially 1:1 (by volume) mixture of ethyl alcohol and commercial automotive anti-freeze liquid containing ethylene glycol.

The pump 50 delivers the working fluid into the evaporator 44 where it is cooled in heat exchange relationship with the refrigerant utilized in the air conditioning subsystem. More specifically, in accordance with one aspect of the present invention the conventional evaporator 44 of the automobile 30 is modified or supplemented to cool the working fluid. As is shown schematically on FIG. 1, the upper portion 54 of the evaporator 44 has the plates or fins 56 intertwined with conduits 58 containing the cold gaseous refrigerant. When it is desired to operate the car's air conditioner in a conventional manner, air is forced by a blower or fan (not shown) through the fins 56 and into the interior compartment 60 of the automobile. A second part or portion 62 of the evaporator 44, however, (which may be separately manufactured and provided as an optional, or as an "after market" device) contains conduits 58 wherein the refrigerant of the evaporator 44 is in close proximity to conduits 64 containing the working fluid. FIG. 9 shows a plan view of the second, lower portion 62 of the evaporator 44, and FIGS. 10 and 11 show a cross-sectional view, revealing that the conduits 58 of the refrigerant and the conduits 64 of the working fluid are disposed in close proximity, attached, preferably soldered, to one another for effective heat exchange relationship.

The schematic view of FIG. 1 shows that, in accordance with the first preferred embodiment, the refrigerant which exits from the expansion valve 42 is divided into two parallel streams. A first stream enters the upper portion 54 of the evaporator 44 to cool "forced air" and a second stream enters the lower portion 62 to cool the working fluid. Refrigerant from both portions is returned into the compressor 32, as is shown on FIG. 1. Those skilled in the art will recognize on the basis of the present description that the structure described for the first preferred embodiment is well suited for adding the novel cooling system of the present invention to an existing automotive air conditioning system, either as an option or as an "after market" device. In alternative embodiments, the evaporator 42 installed in the motor vehicle 30 may be adapted by the original manufacturer for heat exchange with the working fluid, so that dividing the stream of refrigerant flowing out of the expansion valve 42 into two separate, parallel streams may not be necessary.

Referring still primarily to FIGS. 1-5 and 9-12, the chilled working fluid is sent by the pump 50 through conduits to cooling coils 66 incorporated in pads 68 disposed in the seat 48 of the automobile 30. In accordance With the invention, one or several seats 48, as well as other parts, such as the steering wheel 70 of the automobile 30 may be cooled by the working fluid; in accordance with the first preferred embodiment only the driver's seat and the steering wheel 70 are cooled. The seat 48 incorporates 3 pads 68, and the cooling coils 66 are disposed in a spiral-like configuration within each pad 68, as is shown in FIGS. 4 and 5. The pads 68 which may be incorporated into the seat 48 substantially in accordance with conventional upholstery technology are made from foam rubber or other material from which seat cushions, or the like, are customarily made. The cooling coils 66 may be made of aluminum, copper or other metal tubing which are good conductors of heat, but plastic tubing may also serve adequately in this regard. As is shown on FIG. 12, the three cooling pads 68 of the seat 48 of the first preferred embodiment are connected serially for flow of the working fluid, and the tubing incorporated in the steering wheel 70 for cooling the same is also serially connected with the cooling pads 68. In alternative embodiments, each cooling pad 68 may be connected separately (parallel) to the pump 58. Similarly, when several seats 48 of a motor vehicle are cooled in accordance with the present invention, the cooling pads 68 of any individual seat 48 may be separately (parallel) connected to the pump 58; alternatively all seats may be connected in a single "loop" (serially).

Returning now primarily to the description of the first preferred embodiment, still under the pressure created by the pump 50 the working fluid from the cooling pads 68 and the steering wheel 70 returns to the liquid reservoir/pump 50. From there it circulates continuously while the cooling system of the present invention is in operation.

FIG. 8 shows a third preferred embodiment of the cooling system of the present invention. This embodiment utilizes a thermoelectric cooler 76 which is incorporated within a seat 48, or arm rest (not shown) of the vehicle 30. The thermoelectric cooler 76 is a state-of-the-art device which is commercially available in the United States, for example, from Marlow Industries Inc. Dallas Tex. The thermoelectric cooler 76 is usually configured as a substantially flat panel (normally a rectangle) of substantially less than one inch thickness, and operates with a power supply of approximately 12 to 15 volts. During operation, one side of the thermoelectric cooler 76 becomes cold, while the other side becomes warm. In accordance with the present invention, the thermoelectric cooler 76 is placed below a pad 68 of a seat 48, or some other portion of the automobile, such as the arm rest (not shown), with the "cold side" facing upwards. A plate 78 of thermally conductive metal, such as copper, aluminum or brass (preferably copper) is placed below the thermoelectric cooler 76 to dissipate the heat generated on the lower side of the thermoelectric cooler 76. Although this is not shown in the drawing figures, a cavity may be formed under the thermoelectric cooler and air may be forced through the cavity (for example by a small fan) to further help to dissipate the heat generated on the lower side of the thermoelectric cooler 76.

The block diagrammatic view of FIG. 13 shows a second preferred embodiment of the present invention, which also operates in conjunction with a conventional, or substantially conventional automobile air conditioning system. In the second preferred embodiment, however, instead of a liquid, air is used as a working fluid to cool the vehicle's seat 48 and steering wheel 70. In this embodiment, air is forced by a blower (not shown) through the evaporator 44. When it is desired to air condition the vehicle in a conventional manner as well as to cool to seat 48 in accordance with the present invention, the stream of chilled air is split into two, with the first portion being introduced through conventional vents into the passenger compartment 60. A second portion of the stream of chilled air, (or when conventional air conditioning is not desired the entire steam of chilled air) is conducted through conduits into a cooling member or body 72, which forms a cavity or chamber 74 in pads 68 located within the seat 48. From the chamber 74 the air may be vented into the ambient, or may be introduced into the interior of the passenger compartment 60 of the vehicle.

Figure 14:
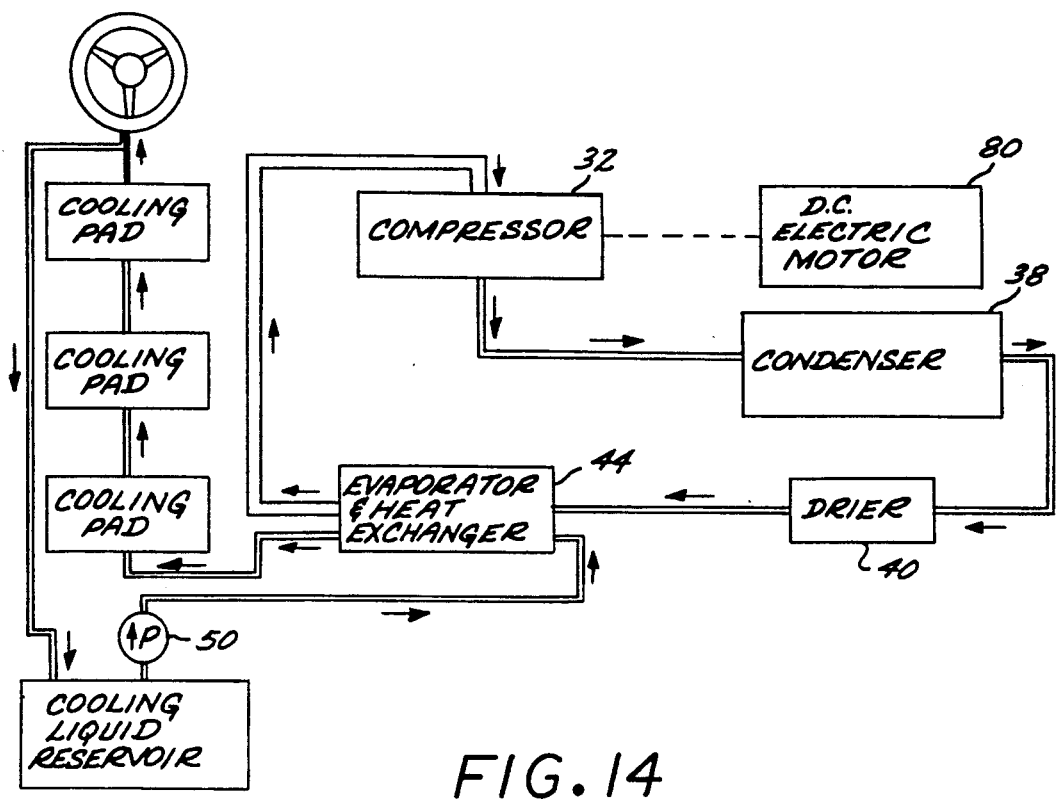
FIG. 14 is a block-diagrammatic representation of the fourth preferred embodiment of the invention.

FIG. 14 diagrammatically shows a fourth preferred embodiment of the present invention, which differs from the first preferred embodiment primarily only in that the fourth embodiment utilizes a separate direct current motor 80 (rather than the engine of the motor vehicle) to drive the compressor 32. In an automotive environment the direct current motor 80 is driven by the current generated by the vehicle.

Figure 15:
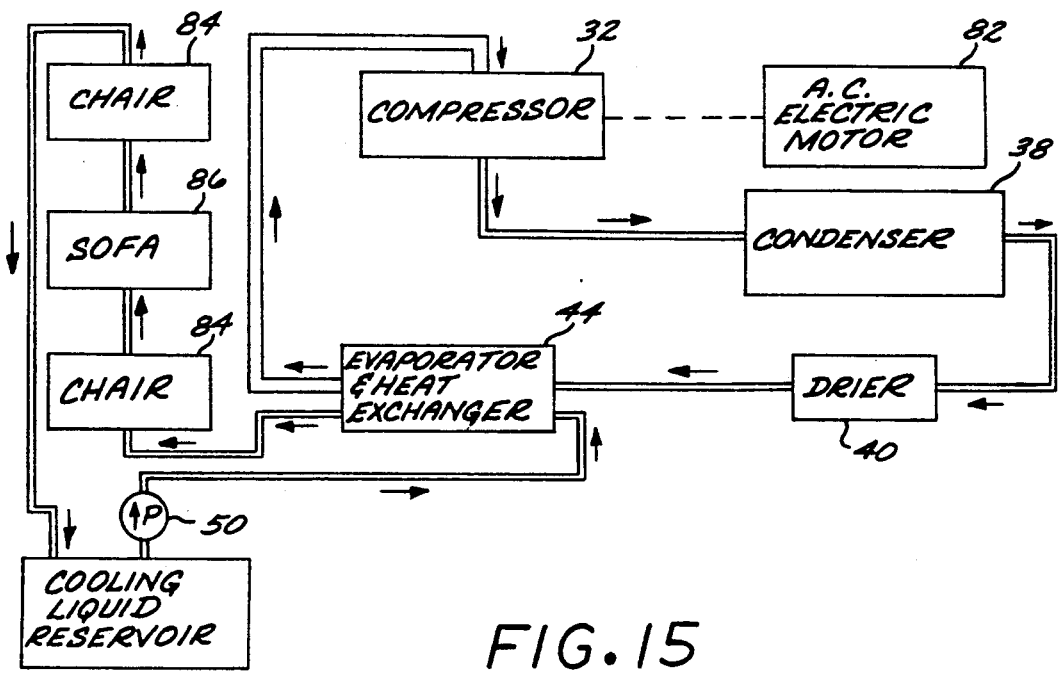
FIG. 15 is a block-diagrammatic representation of the fifth preferred embodiment of the invention.

FIG. 15 shows a fifth preferred embodiment of the present invention. This embodiment is primarily adapted to be used in a home or office environment, and therefore functions in conjunction with a conventional (or substantially conventional) air conditioning system, where the compressor 32 is driven by an a. c. current motor 82. As is shown in the diagrammatic drawing of FIG. 15, the fifth preferred embodiment utilizes a closed loop circuit for a working fluid (preferably a liquid) which circulated by a pump 50 from the evaporator 44 and heat exchanger 44 to several units of furniture, such as two chairs 84 and a sofa 86. Although this is not specifically shown in connection with the fifth preferred embodiment of FIG. 15, cooling coils 66 are disposed in cooling pads 68 which are incorporated and serially connected, in each chair 84 and the sofa, substantially in the manner which is indicated on FIGS. 2, 4 and 5 in connection with the first preferred embodiment.

The cooling system of the present invention can be electronically controlled rom a control panel (not shown) which may be located on the instrument board of the vehicle. As it will be readily understood by those skilled in the art in light of the present disclosure, the cooling system of the present invention is influenced by operation of the air conditioning subsystem, and also by operation of the pump 50. Each of these can be electrically controlled in accordance with the state of the art. In addition, with specific reference to FIG. 1, a manifold (shown on FIG. 1 as part of the expansion valve 42) which distributes the refrigerant between the first 54 and second 62 portions of the evaporator 44 may be equipped with an electronically controllable valves so that, for example when traditional air-conditioning is not desired all of the refrigerant may be directed into the second portion 62. In accordance with the state of the art, thermal sensors (not shown) may be incorporated into the seat 48, to provide thermostatic control of the cooling system.

Several modifications of the present invention may become readily apparent to those skilled in the art in light of the foregoing disclosure. Therefore, the scope of the present invention should be interpreted solely from the following claims, as such claims are read in light of the disclosure.

What is claimed is:

1. A system for directly cooling a seat to be occupied by a human, the seat being located in a defined space constituting a desired comfort zone for the human, the system comprising:
    a closed loop air conditioning subsystem which includes a first motor driving a compressor in which a refrigerant fluid is compressed, a condenser wherein the compressed fluid is cooled in heat exchange relationship with the environment, an evaporator into which the refrigerant fluid is released from the condenser and wherein the refrigerant fluid expands thereby absorbing heat from the evaporator and cooling the same, the refrigerant fluid returning to the compressor from the evaporator, means for blowing air through the evaporator in heat exchange relationship therewith for generating chilled air and for blowing the chilled air into the comfort zone, whereby the air conditioning subsystem is operational and cools the comfort zone;
    a closed loop seat cooling subsystem which comprises:
    a second motor;
    pump means driven by the second motor for circulating a working fluid;
    a heat exchanger disposed in operative heat exchange relationship with the evaporator of the air conditioning subsystem whereby the working fluid is cooled in the evaporator;
    cooling coils disposed substantially within the seat, and
    conduit means for fluidly connecting, in a closed loop, the pump means, the heat exchanger and the cooling coils whereby the working fluid circulates from the cooling coil to the heat exchanger through the pump, and whereby the working fluid and the refrigerant fluid in the evaporator are in heat exchange relationship with one another, and whereby the seat is cooled by the system.

2. The system of claim 1 which is incorporated in a motor vehicle and where the cooling coils are disposed in a cooling pad, and the pad is located substantially within the interior of a seat of the motor vehicle.

3. The system of claim 2 where the first motor driving the compressor is the engine of the motor vehicle.

4. The system of claim 3 where the second motor is an electric motor.

5. The system of claim 4 where the second motor is driven by D. C. current.

6. The system of claim 1 where the working fluid is a liquid.

7. The system of claim 6 where the liquid working fluid is a mixture of ethyl alcohol and of an automotive anti-freeze liquid containing ethylene glycol.

8. The system of claim 1 where the cooling coils are disposed in a pad, and are configured substantially in the shape of a spiral.

9. The system of claim 1 which is incorporated in a motor vehicle and where the cooling coils are disposed in a cooling pad which is located substantially within the interior of a seat of the motor vehicle, and wherein the cooling coils are further disposed within the steering wheel of the vehicle.

10. The system of clam 1 which is incorporated in a motor vehicle and where the cooling coils are disposed in several cooling pads and where each of the cooling pads is located within the interior of a seat in the motor vehicle.

11. The system of claim 10 wherein the several cooling pads are connected for serial flow of the working fluid.

12. The system of claim 10 wherein the heat exchanger is connected to each cooling pad for parallel flow of the working fluid.

13. A cooling system for cooling at least one seat of a motor vehicle, the motor vehicle having an interior space, the cooling system comprising:
    a closed loop air conditioning subsystem which includes a compressor driven by the engine of the vehicle, a refrigerant fluid being compressed in the compressor, a condenser wherein the compressed fluid is cooled by ambient air, an evaporator into which the refrigerant fluid is released from the condenser and wherein the refrigerant fluid expands thereby absorbing heat from the evaporator and cooling the same, the refrigerant fluid returning to the compressor from the evaporator, means for blowing air through the evaporator in heat exchange relationship therewith for generating chilled air and for blowing the chilled air into the interior space, whereby the air conditioning subsystem is operational and cools the interior space;
    a seat cooling subsystem which comprises:
    a second motor;
    pump means driven by the second motor for moving a working fluid;
    a heat exchanger disposed in operative heat exchange relationship with the evaporator of the air conditioning subsystem whereby the working fluid is cooled in the evaporator;
    cooling means disposed substantially within the seat for cooling the seat in heat exchange relationship with the working fluid, and
    fluid conduit means for connecting the pump means, the heat exchanger and the cooling means whereby the working fluid is driven by the pump from the heat exchanger to the cooling means and whereby the working fluid and the refrigerant fluid in the evaporator are in heat exchange relationship with one another, and whereby the seat is cooled by the system.

14. The system of claim 13 where the working fluid is air.

15. The system of claim 14 where the cooling means includes an exhaust vent for venting air which had been in heat exchange relationship with the seat, into the ambient from the cooling means.

16. The system of claim 13 where the working fluid is liquid, and where the pump means, the heat exchanger and the cooling means together with the fluid conduit means form a closed loop.

17. The system of claim 16 where the cooling means comprise a cooling coil.

18. The system of claim 17 wherein the cooling coil is incorporated within a pad.

19. The system of claim 17 comprising several cooling coils, each cooling coil being disposed in a seat of the motor vehicle.

* * * * *